United States Patent
Pise et al.

(10) Patent No.: US 9,817,739 B1
(45) Date of Patent: Nov. 14, 2017

(54) METHOD TO RESTORE A VIRTUAL ENVIRONMENT BASED ON A STATE OF APPLICATIONS/TIERS

(71) Applicant: Veritas Technologies LLC, Mountain View, CA (US)

(72) Inventors: Mandar Pise, Pune (IN); Amit Gaurav, Ranchi (IN); Jahangir Ahmad, Pune (IN); Swapnil Koulgikar, Pune (IN); Makarand Chatur, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 675 days.

(21) Appl. No.: 13/665,672

(22) Filed: Oct. 31, 2012

(51) Int. Cl.
*G06F 11/00* (2006.01)
*G06F 11/30* (2006.01)
*G06F 11/14* (2006.01)
*G06F 9/44* (2006.01)
*G06F 3/06* (2006.01)

(52) U.S. Cl.
CPC ...... *G06F 11/3051* (2013.01); *G06F 11/1458* (2013.01); *G06F 3/0635* (2013.01); *G06F 8/71* (2013.01)

(58) Field of Classification Search
CPC ...... G06F 11/3051; G06F 3/0635; G06F 8/71; G06F 11/1458
USPC .......................................................... 714/15
See application file for complete search history.

(56) References Cited

U.S. PATENT DOCUMENTS

| | | | | |
|---|---|---|---|---|
| 6,117,187 A | * | 9/2000 | Staelin | G06F 8/61 717/169 |
| 6,662,358 B1 | * | 12/2003 | Berry | G06F 17/30 714/47.2 |
| 7,320,088 B1 | * | 1/2008 | Gawali | G06F 11/1662 709/219 |
| 7,370,229 B2 | * | 5/2008 | Ohno | G06F 3/0605 714/6.1 |
| 7,640,454 B1 | * | 12/2009 | Botes | G06F 11/1438 714/19 |
| 7,694,277 B2 | * | 4/2010 | Yuknewicz | G06F 8/71 717/121 |
| 7,711,705 B1 | * | 5/2010 | Patsenker | H04L 67/1097 707/613 |
| 8,219,769 B1 | * | 7/2012 | Wilk | 711/162 |
| 8,286,174 B1 | * | 10/2012 | Schmidt et al. | 718/104 |
| 8,413,144 B1 | * | 4/2013 | Manmohan et al. | 718/1 |
| 8,560,671 B1 | * | 10/2013 | Yahalom et al. | 709/224 |
| 8,607,328 B1 | * | 12/2013 | Hodges | 726/15 |
| 8,782,637 B2 | * | 7/2014 | Khalid | G06F 8/61 718/1 |
| 8,843,903 B1 | * | 9/2014 | Blaser et al. | 717/135 |
| 8,949,653 B1 | * | 2/2015 | Kayan et al. | 714/1 |
| 9,141,381 B2 | * | 9/2015 | Siddegowda | G06F 8/71 |
| 9,235,474 B1 | * | 1/2016 | Petri | G06F 11/1417 |
| 2001/0008019 A1 | * | 7/2001 | Vert | G06F 11/1662 714/1 |

(Continued)

*Primary Examiner* — Loan L. T. Truong
(74) *Attorney, Agent, or Firm* — Wilmer Cutler Pickering Hale and Dorr LLP (57) ABSTRACT

Methods and apparatuses for triggering backups of virtual machines using high-availability applications in the virtual machines are described herein. Also, methods and apparatuses for restoring individual components that are backed up within an application infrastructure within the virtual machine are described herein.

20 Claims, 5 Drawing Sheets

(56) References Cited

U.S. PATENT DOCUMENTS

| | | | |
|---|---|---|---|
| 2003/0009253 A1* | 1/2003 | McIntyre | G05B 23/0216 700/108 |
| 2003/0065902 A1* | 4/2003 | Shiga | G06F 3/0601 711/170 |
| 2003/0101245 A1* | 5/2003 | Srinivasan | G06F 9/44505 709/221 |
| 2004/0255186 A1* | 12/2004 | Lau | G06F 11/20 714/6.12 |
| 2005/0015641 A1* | 1/2005 | Alur | G06F 11/1458 714/2 |
| 2005/0027842 A1* | 2/2005 | Kline | 709/223 |
| 2005/0267920 A1* | 12/2005 | Helliker et al. | 707/204 |
| 2006/0179432 A1* | 8/2006 | Walinga et al. | 717/171 |
| 2006/0184927 A1* | 8/2006 | Deblaquiere et al. | 717/168 |
| 2006/0277383 A1* | 12/2006 | Hayden | H04L 69/14 711/170 |
| 2007/0121631 A1* | 5/2007 | Krikorian | G06F 9/546 370/392 |
| 2007/0157192 A1* | 7/2007 | Hoefler | G06F 8/65 717/168 |
| 2007/0180116 A1* | 8/2007 | Kim | H04L 67/1008 709/226 |
| 2007/0240152 A1* | 10/2007 | Li et al. | 717/174 |
| 2007/0271304 A1* | 11/2007 | Atluri | G06F 11/1464 |
| 2007/0271428 A1* | 11/2007 | Atluri | 711/162 |
| 2008/0016569 A1* | 1/2008 | Hammer | G06F 21/554 726/23 |
| 2008/0046813 A1* | 2/2008 | Doatmas | G06F 17/211 715/240 |
| 2008/0052027 A1* | 2/2008 | Witter | G06Q 20/102 702/108 |
| 2008/0092036 A1* | 4/2008 | Boffemmyer | G06F 17/30569 715/234 |
| 2008/0109615 A1* | 5/2008 | Morishita | G06F 3/0605 711/154 |
| 2008/0174426 A1* | 7/2008 | Hackworth | G06F 3/0605 340/540 |
| 2008/0195369 A1* | 8/2008 | Duyanovich | G06F 11/0709 703/22 |
| 2008/0244307 A1* | 10/2008 | Dasari | G06F 11/1482 714/4.12 |
| 2008/0288634 A1* | 11/2008 | Onacko | H04L 41/5009 709/224 |
| 2008/0307438 A1* | 12/2008 | Creamer | H04L 67/1008 719/318 |
| 2009/0037494 A1* | 2/2009 | Wong | G06F 17/30368 |
| 2009/0067324 A1* | 3/2009 | Licardie | H04L 12/40182 370/225 |
| 2009/0125570 A1* | 5/2009 | Bailey | G06F 17/30244 |
| 2009/0126002 A1* | 5/2009 | Vail | H04L 63/0209 726/12 |
| 2009/0133033 A1* | 5/2009 | Lindo | G06F 11/0778 718/108 |
| 2009/0271445 A1* | 10/2009 | Emaru | G06F 11/2069 |
| 2009/0276771 A1* | 11/2009 | Nickolov et al. | 717/177 |
| 2010/0153543 A1* | 6/2010 | Lee | H04L 43/16 709/224 |
| 2010/0153638 A1* | 6/2010 | Yochai | G06F 11/1464 711/113 |
| 2010/0223306 A1* | 9/2010 | Liu | G06F 9/44505 707/822 |
| 2010/0275060 A1* | 10/2010 | Liu | G06F 11/1451 714/15 |
| 2011/0055165 A1* | 3/2011 | McKay | G06Q 10/06 707/682 |
| 2011/0197094 A1* | 8/2011 | Wagner | G06F 11/301 714/20 |
| 2011/0225582 A1* | 9/2011 | Iikura | G06F 11/1415 718/1 |
| 2011/0302312 A1* | 12/2011 | McCrory | G06F 9/541 709/226 |
| 2011/0320286 A1* | 12/2011 | Zohar | G06Q 30/0276 705/14.72 |
| 2012/0143821 A1* | 6/2012 | Mallya | H04L 41/0853 707/639 |
| 2012/0151501 A1* | 6/2012 | Manmohan | G06F 9/44505 719/317 |
| 2012/0210398 A1* | 8/2012 | Triantafillos | G06F 11/1458 726/4 |
| 2012/0290827 A1* | 11/2012 | Bhargava | G06F 11/3006 713/100 |
| 2012/0303583 A1* | 11/2012 | Chowdhry | G06F 11/1451 707/640 |
| 2012/0311116 A1* | 12/2012 | Jalan | H04L 67/34 709/222 |
| 2013/0007262 A1* | 1/2013 | Akatoki | H04L 43/04 709/224 |
| 2013/0117231 A1* | 5/2013 | Sridharan et al. | 707/639 |
| 2013/0125107 A1* | 5/2013 | Bandakka | G06F 8/665 717/171 |
| 2013/0139139 A1* | 5/2013 | Mallur | G06F 8/65 717/170 |
| 2013/0139183 A1* | 5/2013 | Mallur | G06F 8/63 719/321 |
| 2013/0204948 A1* | 8/2013 | Zeyliger | G06F 9/44505 709/206 |
| 2013/0227699 A1* | 8/2013 | Barak et al. | 726/26 |
| 2013/0227710 A1* | 8/2013 | Barak et al. | 726/29 |
| 2013/0282188 A1* | 10/2013 | Donde | G06Q 50/06 700/286 |
| 2013/0326265 A1* | 12/2013 | Garai | G06F 11/2038 714/6.3 |
| 2014/0006623 A1* | 1/2014 | Hohndel | G06F 9/5011 709/226 |
| 2014/0081972 A1* | 3/2014 | Eriksson | G06F 9/45533 707/736 |

* cited by examiner

METHOD TO RESTORE A VIRTUAL ENVIRONMENT BASED ON A STATE OF APPLICATIONS/TIERS

TECHNICAL FIELD

The embodiments of the disclosure relate generally to virtual machine systems and, more specifically, relate to backing up and restoring a virtualized environment.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Many organizations have started to virtualize their IT environments to save cost. Because larger numbers of systems are becoming virtualized, organizations are looking for more efficient backup and quicker recovery of their virtual systems to maintain business productivity and cost savings that server virtualization delivers. This includes not only the guest VMs, but also the applications that have also been installed on those guest VMs, such as Microsoft Exchange®, SQL Server®, and Active Directory®. However, typical backup technology has not been built specifically for protecting virtual environments.

SUMMARY OF THE INVENTION

Methods and apparatuses for triggering backups of virtual machines using high-availability applications in the virtual machines are described herein. Also, methods and apparatuses for restoring individual components that are backed up within an application infrastructure within the virtual machine are described herein.

In one embodiment of a method, processing logic begins by monitoring, by application for high availability (HA) (hereinafter HA App or HA application), an application health status of an application running in a virtual machine executing on the computing system. Processing logic detects changes in configuration files of the application and records the changes in the configuration files. In response to the changes, the processing logic initiates a backup of the application by the HA application in response to the changes.

In a further embodiment of the method, the processing logic records the changes in the configuration files by recording the changes with filenames of the configuration files. In another embodiment, the processing logic records the changes in the configuration files by 1) generating a first tag definition that describes the changes when there are detected changes, 2) generating a second tag definition that describes the application health status of the application running in the virtual machine when there are detected changes and when there are not detected changes, and 3) generating a cumulative tag definition that includes at least the second tag. The processing logic may send the cumulative tag to a backup system to backup the virtual machine by creating a backup image using the cumulative tag. The backup system may reside on a second computing system coupled to the computing system over a network. Alternatively, the backup system can reside on the same computing system as the VM.

In another embodiment, the processing logic monitors an application tier that is running in a virtual environment. The application tier may include one or more virtual machines. The processing logic detects changes in the application tier, and initiates a second backup of the application tier in response to the changes in the application tier.

In another embodiment of the method, the processing logic monitors an application infrastructure of the virtual machine and identifies components of the application infrastructure that are backed up. The processing logic monitors the identified components to detect a failure of one of the identified components. The processing logic restores the one identified component of which the failure is detected to a backed up version of the one identified component without restoring other ones of the identified components. In a further embodiment, the processing logic puts the one identified component of which the failure is detected into a maintenance mode to restore the one identified component to the backed up version.

In addition, a computer readable storage medium for backing up and restoring components of a virtual machine is described. An exemplary computer readable storage medium provides instructions, which when executed on a processing system causes the processing system to perform a method such as the exemplary methods discussed above.

Further, systems and apparatus for backing up and restoring components of a virtual machine are described. An exemplary apparatus may include a memory and a processor coupled to the memory. The processor is configured to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and apparatuses for triggering backups of virtual machines using high-availability applications in the virtual machines are described herein. Also, methods and apparatuses for restoring individual components that are backed up within an application infrastructure within the virtual machine are described herein. The embodiments described herein provide methods and mechanisms for backing up and restoring virtual environment, and, in particular, to backing up and restoring virtual machines.

Typically, backups of virtual machines are always based on assumptions about the applications running inside the virtual machine. These assumptions do not provide confidence of the virtual image and the application state of the applications within the virtual machine. The proposed embodiments can initiate backups or snapshots of one or more virtual machines as triggered by application monitoring software (e.g., such as high-availability HA applications like Veritas Cluster Server (VCS)). VCS can run inside or outside a virtual machine. The embodiments described herein build confidence in virtual image backup/restore of running applications in the virtual machine that are made highly available using solutions such as VCS.

Instead of backing up by taking snapshots of virtual machine images randomly or by observing application state based on certain assumption, the embodiments described herein rely on initiating backup of virtual machines by HA applications such as VCS. Similarly, the embodiments can be applicable to different application tiers running on virtual machines that are part of virtual environment (also referred to as a cloud environment) as described herein.

In the following description, numerous details are set forth. It will be apparent, however, to one of ordinary skill in the art having the benefit of this disclosure, that embodiments of the present invention may be practiced without these specific details.

Figure 1:
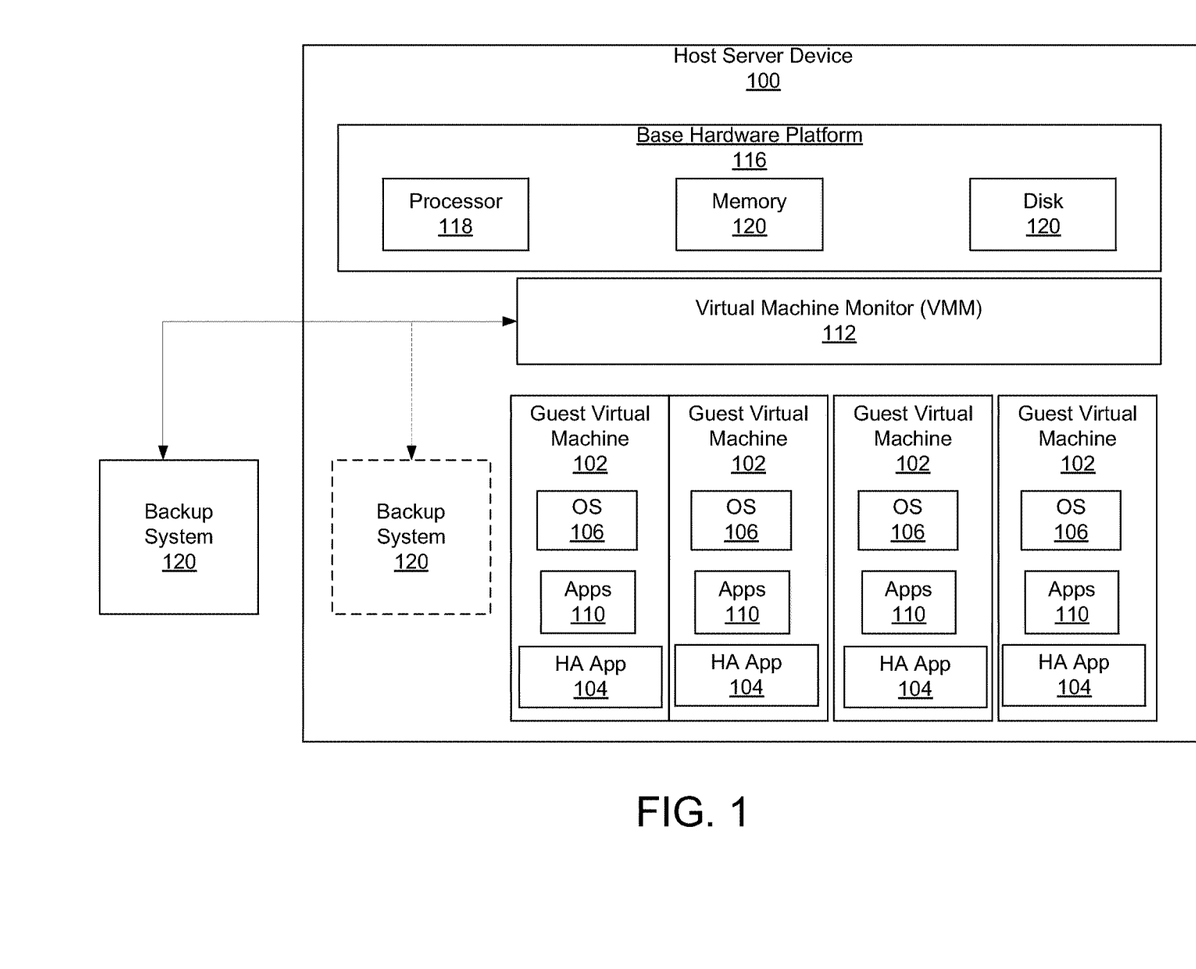
FIG. 1 illustrates one embodiment of a virtual machine (VM) host server device, which employs a virtual machine monitor (VMM), multiple VMs with high-availability (HA) applications for application monitoring to initiate backups of a virtual environment by a backup system.

FIG. 1 illustrates one embodiment of a virtual machine (VM) host server device 100, which employs a virtual machine monitor (VMM) 112, multiple VMs 102 with HA applications 104 for application monitoring to initiate backups of a virtual environment by a backup system 120. As illustrated, base platform hardware 116 includes a computing platform, which may be capable, for example, of executing an operating system (OS) a virtual-machine monitor (VMM), such as VMM 112, or both. In some embodiments, base hardware platform 116 may include a processor 118, memory and storage devices 120 (e.g., storage devices or memory), input/output (I/O) devices, network devices, drivers, and so on. The storage devices may be non-volatile memory, such as a hard disk drive, tape drive, flash memory, optical disc drive or the like. The base platform hardware 116 can be a personal computer (PC), server computer, mainframe, handheld device, portable computer, set-top box or any other computing system. In the depicted embodiment, the VMM 112 virtualizes the physical resources of the base hardware platform 116 for one or more guest VMs 102 that are hosted by the server device 100 having the base hardware platform 116. In some embodiments, the VMM 112 may also be referred to as a hypervisor, a kernel-based hypervisor (e.g., Kernel-based VM (KVM)), or a host OS. In one embodiment, each VM 102 includes a guest operating system (OS), such as guest OS 106 and various guest software applications 110.

The VMM 112, though typically implemented in software, may emulate and export a bare machine interface to higher-level software. Such higher-level software may comprise a standard or real-time OS, may be a highly stripped down operating environment with limited operating system functionality, may not include traditional OS facilities, etc. In one embodiment, the VMM 112 is run directly on base platform hardware 116. In another embodiment, the VMM 112 is run on top of a host OS. Alternatively, for example, the VMM 112 may be run within, or on top of, another VMM. VMMs may be implemented, for example, in hardware, software, firmware or by a combination of various techniques.

The VMM 112 presents to other software (i.e., "guest" software) the abstraction of one or more virtual machines (VMs) 102, which may provide the same or different abstractions to the various guests. FIG. 1 shows multiple virtual machines 102, each with a guest operating system 106.

When a VM 102 is shut off, the VM 102 may be stored as a virtual machine file that contains the state of the VM 102. A virtual machine file defines a memory state of a virtual machine (e.g., of one of virtual machines 102). Examples of virtual machine files include .VMX files, .VMDK files, .VHD files, etc. The virtual machine files may be mounted by virtualization software to generate the virtual machines 102.

The backup system 120 is configured to perform backup operations to backup the VMs 102 as described in more detail. The backup by the backup system 120, such as by taking snapshots of one or more of the VMs 102, can be initiated or triggered by the HA applications 104, such as VCS, running inside the one or more virtual machines 102. For example, VCS is high-availability cluster software for computer system that provides application cluster capabilities to systems running other applications, including databases, network file sharing, electronic commerce websites or the like. High-availability clusters (also known as HA clusters or failover clusters) are groups of computers that support server applications that can be reliably utilized with a minimum of downtime. High availability clusters (HAC) improve, such as VCS, application availability by failing them over or switching them over in a group of systems. Most VCS implementations attempt to build availability into a cluster, eliminating single points of failure by making use of redundant components like multiple network cards, storage area networks in addition to the use of VCS. Similar HA software products may be used other than VCS, such as Fujitsu PrimeCluster, IBM HACMP, HP Serviceguard, IBM Tivoli Systems Automation for Multi-platforms (SA MP), Linux-HA, Microsoft Cluster Server (MSCS), NEC ExpressCluster, Red Hat Cluster Suite, SteelEye LifeKeeper, Sun Cluster or the like. VCS is mostly user-level clustering software and most VCS processes are normal system processes on the systems it operates on, and have no special access to the OS or kernel functions in the host systems.

Some embodiments can also provide backup of virtual machines externally irrespective of status or health of application or status as reported by the HA application cluster software such as VCS. Also, confidence of a cluster server group (CSG) or service group state can be provided by VCS rather than just externally monitoring application state. Also, this may help in the backup/restore of virtual environments running within Virtual Business Service (VBS). Virtual Business Services provide continuous high availability and reduce frequency and duration of service disruptions for multi-tier business applications running on heterogeneous operating systems and virtualization technologies. A Virtual Business Service represents the multi-tier application as a single consolidated entity and builds on the high availability and disaster recovery provided for the individual tiers by VCS or other HA applications. Additionally, a Virtual Business Service can also represent all the assets used by the service such as arrays, hosts and file systems, though they are not migrated between server tiers. A Virtual Business Service provides a single consolidated entity that represents a multi-tier business service in its entirety. Application components that are managed by VCS or other HA applications can be actively managed through a Virtual Business Service.

As described above, typically backups of VMs are initiated outside of the VM. Instead of taking random virtual machine images or by observing application state based on certain assumptions about the virtual machine's state, the backup by the backup system 120 is initiated by the HA applications 104. The same techniques can be applied to different application tiers running on virtual machines that are part of a cloud environment.

There are different methods to implement this backup mechanism. For example, the HA application 104 (e.g., VCS) can have an agent or other type of resource running inside the CSG or service group that initiates backup of virtual machine by the backup system 120. In one implementation, the agent can initiate backup of one or more of the VMs 102. In another embodiment, the agent can monitor application state and initiate a snapshot by the backup system 120. In all above methods, the backup is renamed, stating that it is initiated by HA application 104 (e.g., VCS) based on its application state.

The following is one embodiment of an algorithm to implement initiation of the backup using VCS as the HA application 104:

1. VCS is running inside Virtual Machine 102 and Application CSG or service group is online
2. VCS monitors the application state or its health and initiates a snapshot/backup once it reaches certain threshold e.g. application is online for past 7 monitor cycles
3. The snapshot request is sent to backup script running in the backup system 120. For example, the backup system 120 can be running outside VM, such as on the host server device 100 or on some other remote machine responsible for taking VM backups of the VMs 102 on the host server device 100.
4. Once backup script receives a request, the backup script initiates backup and names the VM backup as initiated by the VM 102 itself or VCS running inside VM 102.

The same concept can be extended to Virtual Business Services as would be appreciated by one of ordinary skill in the art having the benefit of this disclosure. The following is an embodiment of an algorithm for backing up the whole virtual environment:

1. All tiers are running on virtual machines with single VM (single node VCS) viz. applications such as Web Service Tier (WebT), Database Tier (DbT) and Application Tier (AppT)
2. VBS is carved out of WebT, DbT and AppT
3. In this case, the AppT faults and VBS state changed to Partial/or with a Risk
4. If VCS is running inside AppT then it tries to restart VM 102 and bring back AppT
5. If AppT doesn't come online even after restarting VM 102 then either VBS or HA application (AppHA) 104 instructs and gets info about last known good backup initiated by VCS and initiates VM restore.

In some embodiments, application programming interfaces (APIs) provided by enterprise backup software products can be used to initiate backup and restore mechanism. In another embodiment, an administrator can login to a remote machine using secure shell (SSH) and initiate backup/restore of Virtual machine manually either on VM Host or SAN storage. This algorithm can be used to restore whole virtual environment.

The backup system 120 can be a component of the VMM 112, a plug-in of the VMM 112, or a separate module within the VMM layer with the same privilege level as the VMM 112. Alternatively, the backup system 120 can operate as an application, operating on top of an OS of the host server device 100. Alternatively, the backup system 120 can reside on another machine coupled to the host server device 100 over a private or public network.

Figure 2:
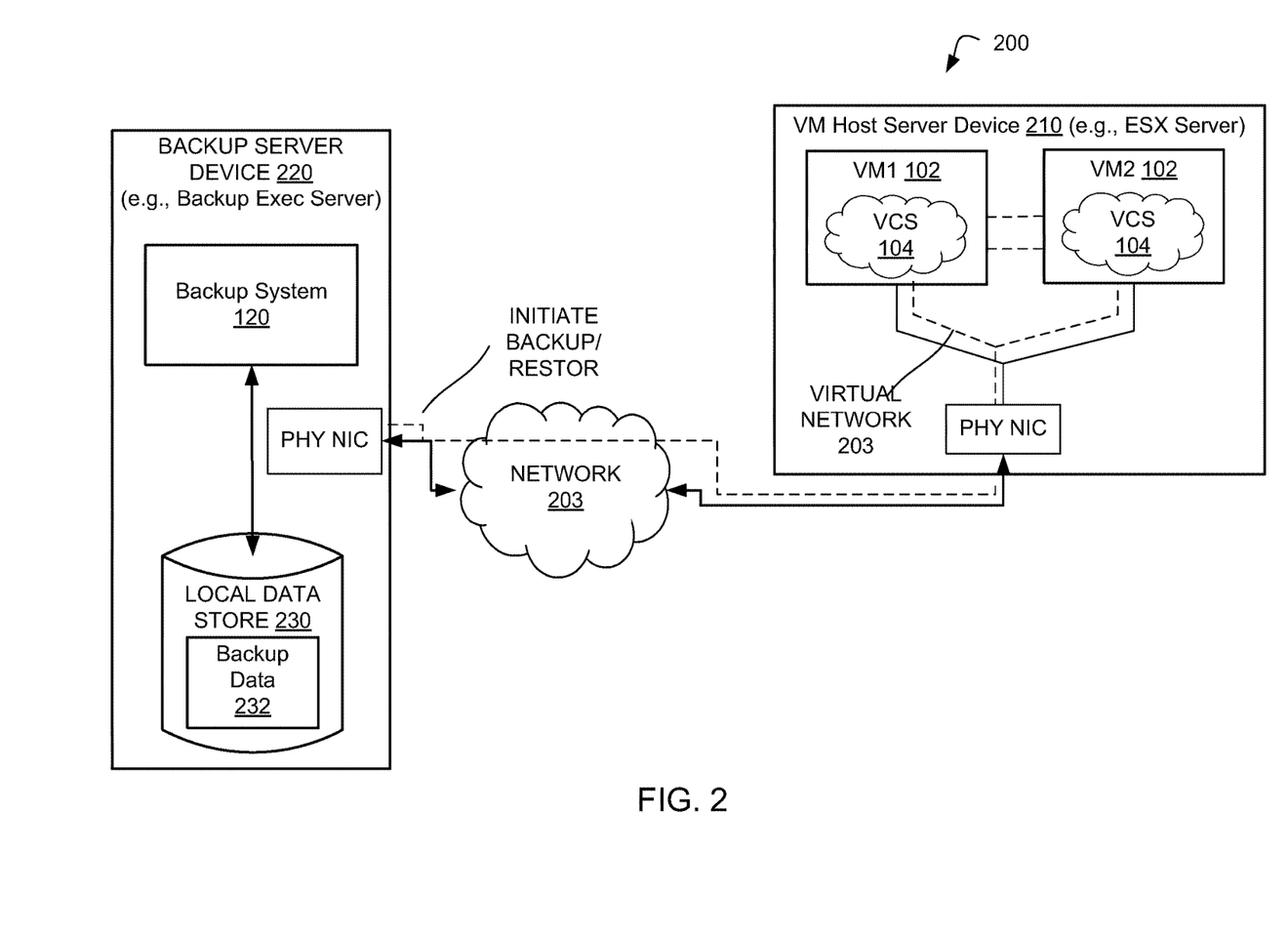
FIG. 2 is a block diagram of exemplary network architecture in which embodiments of a backup server device and the VM host server device may operate.

FIG. 2 is a block diagram of exemplary network architecture 200 in which embodiments of a backup server device 220 and a VM host server device 210 may operate. The network architecture 200 may include backup server device 220 and the VM host server device 210, as well as other devices coupled via a network 203 (e.g., public network such as the Internet or private network such as a local area network (LAN)). The backup server device 220 may include personal computers, laptops, PDAs, mobile phones, network appliances, gateways, servers, etc. The backup server device 220 may include one or more machines that provide the backup capabilities as a backup server, such as hosted backup service. The VM host server device 210 may be a network appliance, a gateway, a personal computer, a server computer, a workstation or a collection of one or more devices (e.g., cloud environment). The backup server device 220 and the VM host server device 210 may reside on the same LAN, or on different LANs that may be coupled together via the Internet, but separated by firewalls, routers, and/or other network devices. In another embodiment, the computing systems may reside on different networks. The VM host server device 210 may host the VMM and multiple VMs as described above with respect to FIG. 1. In one embodiment, the backup server device 220 and VM host server device 210 may be part of an organization, such as a corporate enterprise. Alternatively, the VM host server device 210 and the backup server device 220 may be part of different organizations. In other embodiments, the VM host server device 210 may be one or more machines. In one embodiment, the VM host server device 210 executes the VMs as part of the VMware ESX server. Alternatively, other VMware Virtual Infrastructures can be used, such as VMware's Virtual Infrastructure 3 (VI3) and vSphere 4.0. Also, the VM host server device 210 can execute the Microsoft Hyper-V architecture, as well as other virtual architectures as would be appreciated by one of ordinary skill in the art having the benefit of this disclosure. In one embodiment, the backup server device 220 can execute the BackupExec system, developed by Symantec Corporation of Mountain View Calif. Alternatively, other backup systems can be used.

The HA applications 104 (such as VCS) residing in the VMs 102 on the VM host server device 210 may communicate with the backup system 120, or may communicate with an agent or resource in the cluster server group or service group, and the cluster server group or service group using agent can communicate with the backup system 120. Although the embodiments may use agents, such as the agent in the CSG or service group, in other embodiments, the functionality of these agents can be integrated into the HA applications 104, the VMM 122, the operating system, or other applications for initiating the backup/restore based on the monitored application state within the VM as described herein.

Although only one VM host server device 210 is illustrated in FIG. 2, the VMs can be managed over one or more machines, including one or more server computers, client computers, gateways or other computing devices. In yet another configuration, the backup system 120 and the VMM can reside on a single server, or on different servers, coupled to other devices via a public network (e.g., the Internet) or a private network (e.g., LAN). Similarly, multiple instances of the backup system 120 can be used that communicate with the VM host server device 210. It should be noted that various other network configurations can be used including, for example, hosted configurations, distributed configurations, centralized configurations, etc.

The backup server device 220 may also include a local data store 230, which can be one or more centralized data repositories that store the backup data 232. Alternatively, the backup data can be stored remotely from the backup server device 220, such as in the remote data store. The local data store 230 may represent a single or multiple data structures (databases, repositories, files, etc.) residing on one or more mass storage devices, such as magnetic or optical storage based disks, tapes or hard drives. Although illustrated as being local to the backup server device 220, the local data store 230 may be remote from the backup server device 220 and the backup server device 220 and can communicate with the local data store 230 over a public or private network.

In the depicted embodiment, the VCS in the VMs can monitor the state of one or more applications running on the virtual machine to intelligently initiate a backup or a restore of the VM 102 over a virtual network 203. For example, the backup server device 220 and the VM host server device 210 each include a physical network interface card (NIC) that connects to the public network 203. However, a virtual network 203 can be established between the VMs 102, and between each of the VMs 102 and the backup system 120.

Figure 3:
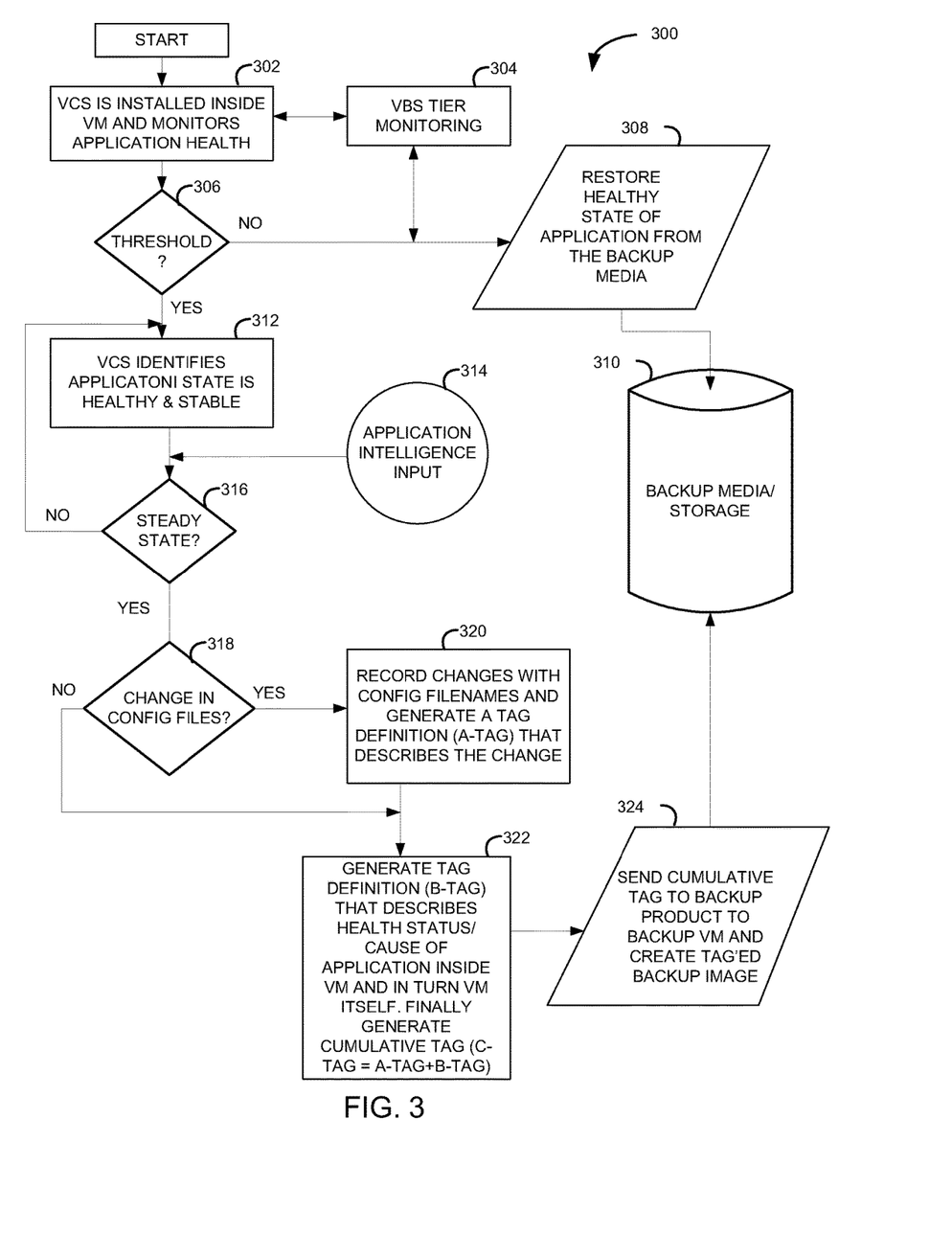
FIG. 3 is a flow diagram of one embodiment of a method of restoring virtual environments based on application state or application tiers running.

FIG. 3 is a flow diagram of one embodiment of a method 300 of restoring virtual environments based on application state or application tiers running. The method 300 is performed by processing logic that may comprise hardware (circuitry, dedicated logic, etc.), software (such as is run on a general-purpose computing system or a dedicated machine), or a combination of both. In one embodiment, the VM host server device 210 perform the method 300. In another embodiment, the HA application 104 (e.g., VCS) and the backup system 120 perform the method 300. Alternatively, other components of the backup server device 220 or VM host server device 210 can be configured to perform some or all of the method 300.

Referring to FIG. 3, processing logic begins method 300 by installing the VCS (or other HA application) inside the VM and monitors the application health (block 302). Processing logic may also monitor application tier monitoring that could be based on VBS (block 304) that monitors tiers carved out of different clusters. At block 306, the processing logic determines if the application is unhealthy when a monitoring threshold value is reached. If the threshold is not reached, the processing logic restores the healthy state of the application from the backup media 310 based on TAGed VM image information (block 308). If the threshold is met at block 306, the VCS identifies application state is healthy & stable (block 312). The processing logic receives application intelligence input (block 314), and determines if the application health inside the VM is at steady state (block 316). For example, after VCS decides application health is stable, it can also take an input from application intelligence monitoring, and if the granular components of applications are OK then the processing logic can factor in that input to describe health of application and identify steady state. If no at block 316, the processing logic returns to block 312. If the VM is at steady state at block 316, the processing logic determines if the application configuration files are changed (block 318). If so, the processing logic records the changes with configuration filenames and generates a TAG definition (e.g., A-Tag) that describes the change (block 320). If at block 318 there are no changes or after the TAG definition is generated at block 320, the processing logic generates TAG definition (e.g., B-Tag) that describes health status and its cause of application inside VM and in turn VM itself (Block 322). Also, the processing logic at block 322 generates a cumulative TAG (e.g., C-Tag) that includes the A-Tag and the B-Tag (e.g., C-Tag=A-Tag+B-Tag). The processing logic sends the cumulative Tag to the backup system to backup the VM by creating a TAG'ed backup image of the VM (block 324).

There may be integration between the HA application 104 (VCS) and the backup system 120 (BackupExec). The HA application 104 monitors the application and if the fault is not corrected by its remedial actions, it initiates the backup system 120. The backup system then restores the VM image with a previously backed up image, closest to the time of fault and also based on tagged information in backed up VM image. In this paradigm, the whole VM is being restored, rather than the unit of application that faulted. For example, if only one database of SQL were corrupted, all the databases go back in time because of this restore, thus, uselessly affecting the recovery point objective (RPO) of all the databases in SQL. In other embodiments that use application intelligence monitoring, the unit of application that faulted can be restored rather than the whole VM being restored.

Also, described herein is a procedure that brings parity between backups taken by the backup system take and what HA app (e.g., VCS) monitors. The HA application may enhance monitoring to backup level components and leverage to provide granular level restores of the application infrastructure. This smaller granularity makes sure that the whole application does not come down when "only" a subset of components fail. This smaller granularity can also increase the uptime of the application as a whole.

If the HA application 104 (e.g., clustering software) provides granular fault detection, the backup system 120 such as BackupExec and Netbackup can leverage the information to restore only the relevant pieces of application. Thus, avoiding complete application downtime and saving on RPO for the non-affected portions of the clustered application. These may be features in VCS or as separate modules than those described herein. These features aim to bring parity between what the backup system restores in an application and what the HA application reports failures on.

In one embodiment, the following algorithm can be used to provide granular fault detection and granular restores:

1. To enhance VCS/ApplicationHA to report parity level faults.

2. Put VCS/ApplicationHA in maintenance mode after BackupExec or Netbackup accepts the fault.

3. Upon intimation from backup software, remove VCS/ApplicationHA from maintenance mode, and start monitoring for the faults again.

This granular monitoring can be used to help restore a granular portion of the application by using backup software. One possible advantage is that of more varied and targeted monitoring in VCS/ApplicationHA with respect to the applications, thus lowering the RPO and better value in Business Continuity in a datacenter.

Figure 4:
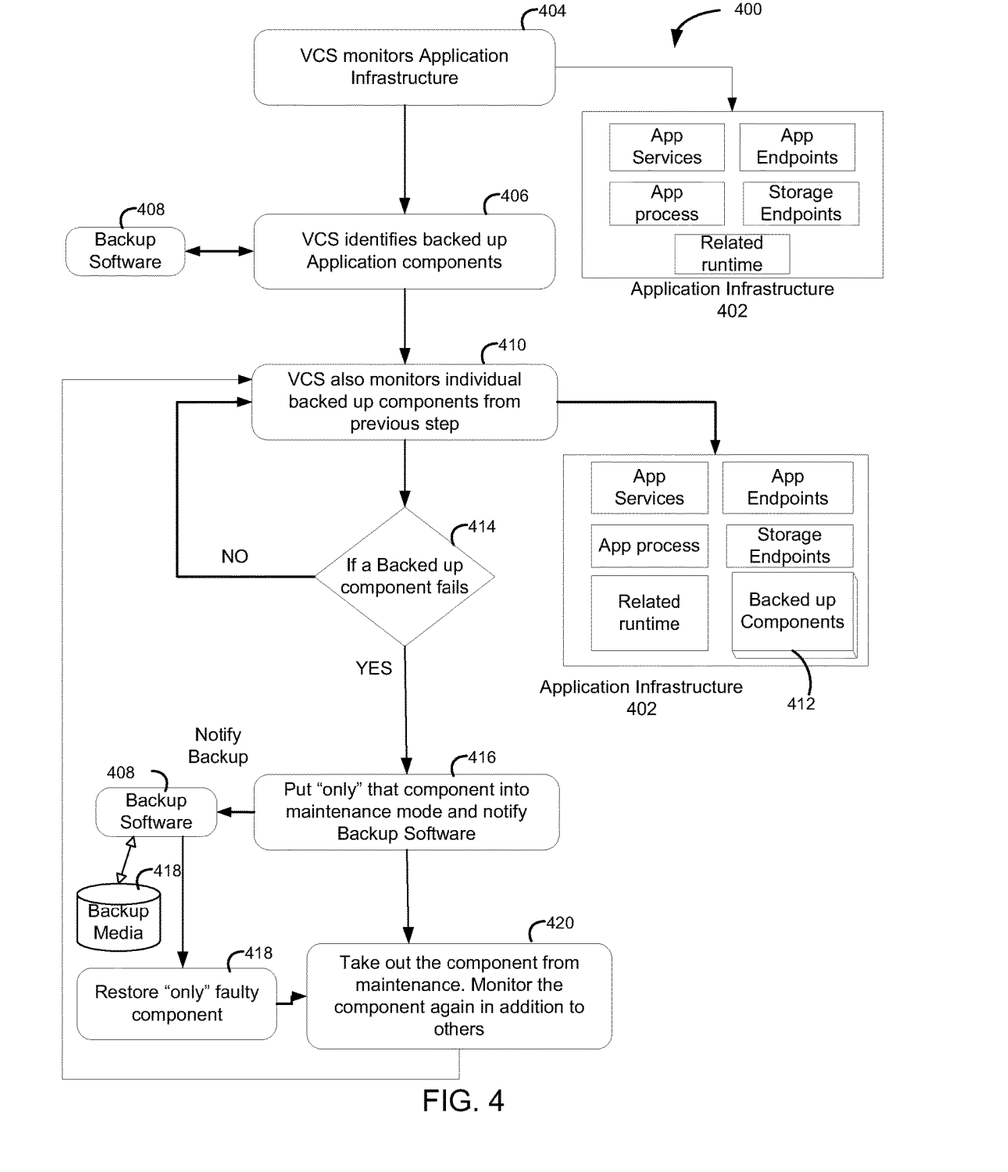
FIG. 4 is a flow diagram of one embodiment of a method of leveraging parity between the backup system and cluster server monitoring restoring a subset of components that have failed.

FIG. 4 is a flow diagram of one embodiment of a method of leveraging parity between the backup system and cluster server monitoring restoring a subset of components that have failed. The method 400 is performed by processing logic that may comprise hardware, software, or a combination of both. In one embodiment, the VM host server device 210 perform the method 400. In another embodiment, the HA application 104 (e.g., VCS) and the backup system 120 perform the method 400. Alternatively, other components of the backup server device 220 or VM host server device 210 can be configured to perform some or all of the method 400.

Referring to FIG. 4, processing logic begins method 400 by the monitoring an application infrastructure 402 (block 404). The application infrastructure 402 may includes one or more application services, one or more application processes, one or more application endpoints, one or more storage points and one or more related runtime processes. The application infrastructure 402 may include more or less. As described below, the backup components can also be part of the application infrastructure 402 being monitored. At block 406, the processing logic identifies backed up application components from the backup system 408 (e.g., backup software). The processing logic also monitors the individual backed-up components 412 from those identified in block 404 (block 410).

At block 414, processing logic determines if a backed-up component fails. If not, the processing logic returns to block 410. If one of the backed-up component fails at block 414, the processing logic puts the failed component into a maintenance mode and notifies the backup system 408 (block 416) and the backup system 408 restores the failed component (block 418) from the backup media 418. The processing logic then takes the failed component out of the maintenance mode, and monitors the component again in addition to the other components (block 420), returning to block 410.

Figure 5:
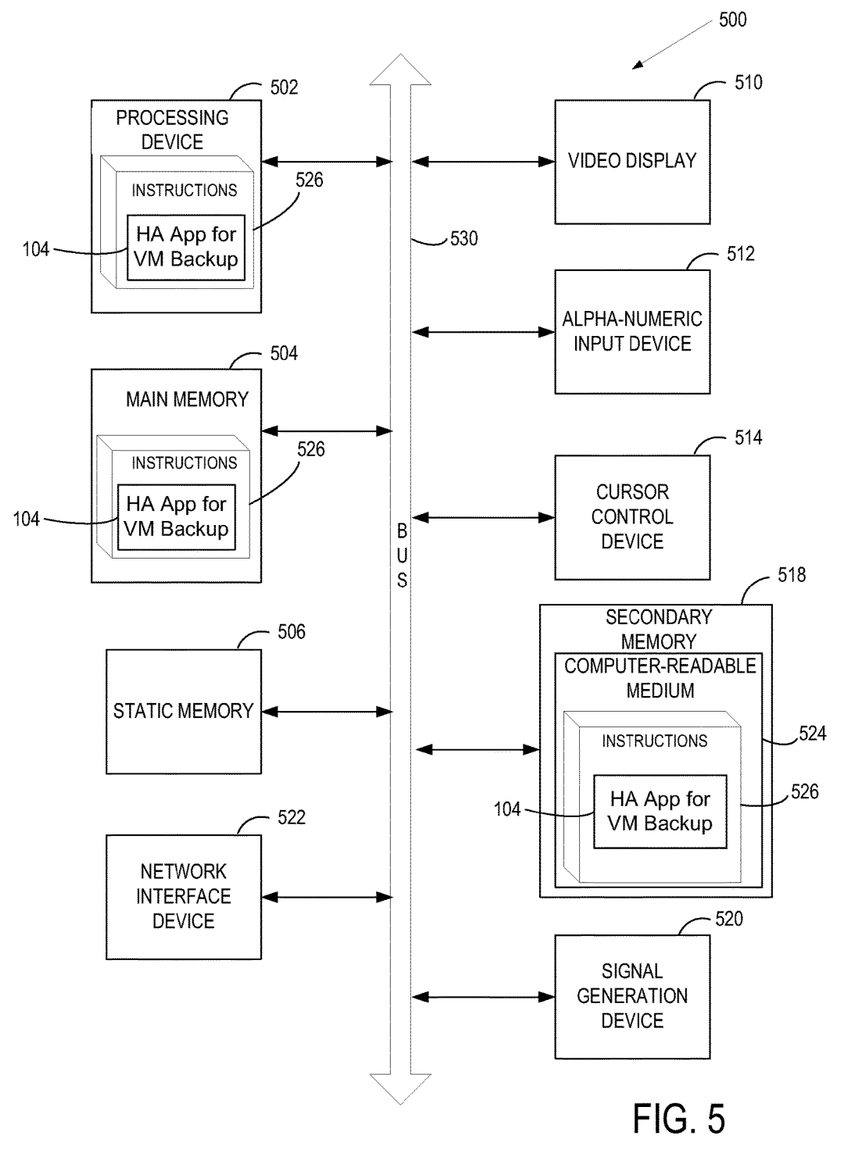
FIG. 5 illustrates a diagrammatic representation of a machine in the exemplary form of a computing system within which a set of instructions, for causing the machine to perform any one or more of the methodologies described herein, may be executed.

FIG. 5 illustrates a diagrammatic representation of a machine in the exemplary form of a computing system 500 within which a set of instructions, for causing the machine to perform any one or more of the methodologies discussed herein, may be executed. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the HA application 104 for VM backup as described herein. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "identifying," "storing," "providing," "selecting," "obtaining," "receiving," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:

monitoring, by a high-availability (HA) application, an application health status of an application running in a virtual machine executing on the computing system;

determining whether the application is at a steady state based on additional monitoring of the application when it is determined from the monitoring of the application health status that the application health status is healthy;

detecting changes in configuration files of the application when it is determined that the application is at the steady state;

recording the detected changes in the configuration files, wherein recording the detected changes comprises generating a first tag definition that describes the changes in configuration files of the application;

generating a second tag definition that describes the application health status of the application running in the virtual machine, wherein the second tag definition is separate from the first tag definition;

generating a cumulative tag definition that includes the first tag definition and the second tag definition; and initiating a backup of the application by the HA application in response to the detected changes.

2. The method of claim 1, wherein the recording the detected changes in the configuration files comprise recording the detected changes with filenames of the configuration files.

3. The method of claim 1,
wherein the cumulative tag definition is separate from the first tag definition and the second tag definition, and
wherein the second tag definition is generated regardless of whether there are detected changes.

4. The method of claim 1, further comprising
sending the cumulative tag to a backup system to backup the virtual machine by creating a backup image using the cumulative tag.

5. The method of claim 4, wherein the backup system resides on a second computing system coupled to the computing system over a network.

6. The method of claim 1, further comprising:
monitoring, by the HA application, an application tier that is running in a virtual environment, wherein the application tier comprises a plurality of virtual machines;
detecting changes in the application tier; and
initiating a second backup of the application tier by the HA application in response to the detected changes in the application tier.

7. The method of claim 1, further comprising:
monitoring an application infrastructure of the virtual machine;
identifying components of the application infrastructure that are backed up;
monitoring the identified components to detect a failure of one of the identified components; and
restoring the one identified component of which the failure is detected to a backed up version of the one identified component without restoring other ones of the identified components.

8. The method of claim 7, further comprising
putting the one identified component of which the failure is detected into a maintenance mode to restore the one identified component to the backed up version.

9. A computing system, comprising:
a memory; and
a processor coupled with the memory, the processor to execute a virtual machine in which an application and a high-availability (HA) application are run, wherein the HA application is configured to:
monitor an application health status of the application running in the virtual machine;
determine whether the application is at a steady state based on additional monitoring of the application when it is determined from the monitoring of the application health status that the application health status is healthy;
detect changes in configuration files of the application when it is determined that the application is at the steady state;
record the detected changes in the configuration files, wherein recording the detected changes comprises generating a first tag definition that describes the changes in configuration files of the application;
generate a second tag definition that describes the application health status of the application running in the virtual machine, wherein the second tag definition is separate from the first tag definition;
generate a cumulative tag definition that includes the first tag definition and the second tag definition; and
initiate a backup of the application by the HA application in response to the detected changes.

10. The computing system of claim 9, wherein the HA application is further configured to:
send the cumulative tag to a backup system to backup the virtual machine by creating a backup image using the cumulative tag,
wherein the cumulative tag definition is separate from the first tag definition and the second tag definition, and
wherein the second tag definition is generated regardless of whether there are detected changes.

11. The computing system of claim 10, wherein the backup system resides on a second computing system coupled to the computing system over a network.

12. The computing system of claim 10, wherein the HA application is further configured to:
monitor an application infrastructure of the virtual machine;
identify components of the application infrastructure that are backed up;
monitor the identified components to detect a failure of one of the identified components; and
restore the one identified component of which the failure is detected to a backed up version of the one identified component without restoring other ones of the identified components.

13. A non-transitory computer readable storage medium including instructions that, when executed by a processor, cause the processor to perform a method comprising:
monitoring, by a high-availability (HA) application, an application health status of an application running in a virtual machine executing on a computing system;
determining whether the application is at a steady state based on additional monitoring of the application when it is determined from the monitoring of the application health status that the application health status is healthy;
detecting changes in configuration files of the application when it is determined that the application is at the steady state;
recording the detected changes in the configuration files, wherein recording the detected changes comprises generating a first tag definition that describes the changes in configuration files of the application;

generating a second tag definition that describes the application health status of the application running in the virtual machine, wherein the second tag definition is separate from the first tag definition;

generating a cumulative tag definition that includes the first tag definition and the second tag definition; and initiating a backup of the application by the HA application in response to the detected changes.

14. The non-transitory computer readable storage medium of claim 13, wherein the recording the detected changes in the configuration files comprise recording the detected changes with filenames of the configuration files.

15. The non-transitory computer readable storage medium of claim 13, wherein the cumulative tag definition is separate from the first tag definition and the second tag definition, and wherein the second tag definition is generated regardless of whether there are detected changes.

16. The non-transitory computer readable storage medium of claim 13, further comprising sending the cumulative tag to a backup system to backup the virtual machine by creating a backup image using the cumulative tag.

17. The non-transitory computer readable storage medium of claim 16, wherein the backup system resides on a second computing system coupled to the processor over a network.

18. The non-transitory computer readable storage medium of claim 13, wherein the method further comprises:

monitoring, by the HA application, an application tier that is running in a virtual environment, wherein the application tier comprises a plurality of virtual machines;

detecting changes in the application tier; and initiating a second backup of the application tier by the HA application in response to the detected changes in the application tier.

19. The non-transitory computer readable storage medium of claim 13, wherein the method further comprises:

monitoring an application infrastructure of the virtual machine;

identifying components of the application infrastructure that are backed up;

monitoring the identified components to detect a failure of one of the identified components; and restoring the one identified component of which the failure is detected to a backed up version of the one identified component without restoring other ones of the identified components.

20. The non-transitory computer readable storage medium of claim 19, further comprising putting the one identified component of which the failure is detected into a maintenance mode to restore the one identified component to the backed up version.

\* \* \* \* \*